(12) United States Patent
Takei

(10) Patent No.: US 12,046,973 B2
(45) Date of Patent: Jul. 23, 2024

(54) STATOR

(71) Applicant: DENSO CORPORATION, Kariya (JP)

(72) Inventor: Toshihiro Takei, Kariya (JP)

(73) Assignee: DENSO CORPORATION, Kariya (JP)

( * ) Notice: Subject to any disclaimer, the term of this patent is extended or adjusted under 35 U.S.C. 154(b) by 245 days.

(21) Appl. No.: 17/828,456

(22) Filed: May 31, 2022

(65) Prior Publication Data

US 2022/0385132 A1 Dec. 1, 2022

(30) Foreign Application Priority Data

May 28, 2021 (JP) ................................. 2021-090600

(51) Int. Cl.
| | |
|---|---|
| *H02K 15/00* | (2006.01) |
| *H02K 3/04* | (2006.01) |
| *H02K 3/14* | (2006.01) |
| *H02K 3/50* | (2006.01) |
| *H02K 15/06* | (2006.01) |

(52) U.S. Cl.
CPC ........... *H02K 3/50* (2013.01); *H02K 2203/09* (2013.01)

(58) Field of Classification Search
CPC ........... H02K 15/0056; H02K 15/0068; H02K 15/0081; H02K 15/024; H02K 15/04; H02K 15/02; H02K 15/064; H02K 15/10; H02K 15/00; H02K 15/085; H02K 3/04; H02K 3/12; H02K 3/14; H02K 3/28; H02K 3/50; H02K 3/505; H02K 2203/09; H02K 2203/06
See application file for complete search history.

(56) References Cited

U.S. PATENT DOCUMENTS

| | | | | |
|---|---|---|---|---|
| 6,501,206 B2 * | 12/2002 | Oohashi | ................... | H02K 3/28 |
| | | | | 310/201 |
| 6,681,477 B2 * | 1/2004 | Shimamoto | ............ | H02K 3/505 |
| | | | | 29/598 |
| 9,419,491 B2 * | 8/2016 | Egami | ...................... | H02K 3/12 |
| 9,496,773 B2 * | 11/2016 | Ishigami | ............... | B60L 15/007 |
| 10,439,462 B2 * | 10/2019 | Hirao | ..................... | H02K 15/06 |
| 10,666,110 B2 * | 5/2020 | Ito | ........................ | H01R 9/223 |
| 11,183,906 B2 * | 11/2021 | Zeadan | ............. | H02K 15/0081 |
| 11,277,047 B2 * | 3/2022 | Murakami | ......... | H02K 15/0068 |

(Continued)

FOREIGN PATENT DOCUMENTS

| | | | | |
|---|---|---|---|---|
| EP | 4160875 A1 * | 4/2023 | ......... | H02K 15/0081 |
| JP | 2000295821 A * | 10/2000 | | |

(Continued)

*Primary Examiner* — Edgardo San Martin
(74) *Attorney, Agent, or Firm* — Oliff PLC

(57) ABSTRACT

A stator includes a stator core, stator windings provided in the stator core, and a busbar connected to coil end portions of the stator windings. The busbar is composed of a flat conductor body and has a main body portion extended in a circumferential direction in parallel to a circumference of the stator core and multiple protruding portions extended radially from the main body portion. The protruding portions and the coil end portions are joined by laser welding. A thickness of each of the protruding portions in a laser beam emitting direction in which a welded portion is irradiated with a laser beam during the laser welding is greater than a plate thickness of the main body portion in the same direction.

8 Claims, 12 Drawing Sheets

(56) References Cited

U.S. PATENT DOCUMENTS

| | | | |
|---|---|---|---|
| 2014/0183993 A1* | 7/2014 | Takasaki | H02K 15/0062 |
| | | | 310/71 |
| 2014/0346915 A1 | 11/2014 | Ishigami et al. | |
| 2015/0108857 A1 | 4/2015 | Takahashi | |
| 2019/0348884 A1* | 11/2019 | Popa | H02K 3/522 |
| 2020/0112236 A1* | 4/2020 | Hirao | H02K 15/04 |
| 2023/0006521 A1* | 1/2023 | Ushida | H02K 3/34 |
| 2023/0088160 A1* | 3/2023 | Ushida | B23K 26/0626 |
| | | | 29/596 |

FOREIGN PATENT DOCUMENTS

| | | | | |
|---|---|---|---|---|
| JP | 2012090511 A | * | 5/2012 | |
| JP | 2019122187 A | * | 7/2019 | |
| JP | 2019-140839 A | | 8/2019 | |
| JP | 6609596 B2 | * | 11/2019 | H02K 1/165 |

* cited by examiner

BEFORE MOLDING

AFTER MOLDING

AFTER FINISHING

STATOR

CROSS-REFERENCE TO RELATED APPLICATION

This patent application is based on and claims priority to Japanese Patent Application No. 2021-090600, filed on May 28, 2021 in the Japan Patent office, the entire disclosure of which is hereby incorporated by reference herein.

BACKGROUND

Technical Field

The present disclosure relates to a stator included in a rotating electric machine.

Related Art

In a known stator of the rotating electric machine, a busbar is used at a neutral point. A busbar is also used in supplying power to respective phases. These busbars are connected to respective coil end portions of a stator winding provided in a stator core. Further, a technology of joining the coil end portion and the busbar together by laser beam welding is known.

In general, to join the coil end portion and the busbar together by laser welding, the stator winding is assembled into the stator core before performing the laser welding. In such a situation, however, when a connection portion connecting the coil end portion and the busbar is irradiated with laser beam, an insulating coat formed on the coil end portion can be damaged due to penetration of the laser beam through a welded portion. In particular, when the connection portion is irradiated with a laser beam coming from outside of the stator in an axial direction thereof, the insulating coat is highly likely to be damaged.

Accordingly, the present disclosure is made to address and resolve the above-described problem, and an object of the present disclosure is to provide a stator capable of allowing precise laser welding performed between a coil end portion and a busbar.

SUMMARY

Accordingly, a first aspect of the present disclosure provides a novel stator that includes a stator core, stator windings provided in the stator core, and a busbar connected to a coil end portion of the stator windings. The busbar is composed of a flat conductor body and has a main body portion extended in a circumferential direction in parallel to a circumference of the stator core and multiple protruding portions extended radially from the main body portion. The protruding portions and the coil end portion are joined by laser welding. A thickness of each of the protruding portions in a laser beam emitting direction in which a welded portion is irradiated with a laser beam during the laser welding is greater than a plate thickness of the main body portion in the same direction.

Hence, according to the first aspect of the present disclosure, a busbar is connected to the coil end portion of the stator windings mounted on the stator core. Such a busbar has a main body portion extended in the circumferential direction of the stator core, and protruding portions extended radially from the main body portion to be connected to the coil end portions by laser welding. With such a configuration, that is, when the protruding portions of the busbar are extended radially from the main body portion and are connected by laser welding to the coil end portions, there is a risk that an insulating member coated on the coil end portion may be damaged by the laser beam penetrating the welded portion. The busbar is generally formed by punching a flat plate, and accordingly, each of the main body portion and the protruding portion has a thickness as same as the flat plate.

In view of this, since the thickness of the protruding portion of the busbar in the direction in which a laser beam is emitted during laser welding is made greater than a plate thickness of the main body portion, it is possible to suppress the laser beam from penetrating the welded portion during the laser welding at the protruding portion. As a result, a busbar can be readily connected by laser welding to a coil end portion of a stator winding.

A second aspect of the present disclosure provides a novel stator, in which a given region of the protruding portion starting from a radial tip surface among a total length of the protruding portion in an extension direction extended from the main body portion has a thickness greater than the plate thickness of the main body portion.

Hence, according to the second aspect of the present disclosure, only in a necessary range of the protruding portion of the busbar in an extending direction extending from the main body portion, the thickness of the protruding portion of the busbar in the laser irradiation direction is made greater. Hence, an increase in heat capacity at the radial tip portion (i.e., a welded portion) of the protruding portion can be inhibited or minimized, and penetration of the laser beam can be suppressed without spoiling weldability.

A third aspect of the present disclosure provides a novel stator, in which at least one side surface of the protruding portion intersecting with the laser beam emitting direction has a convex shape swelling outward.

Hence, according to the third aspect of the present disclosure, the surface of the protruding portion intersecting with the laser irradiation direction defined during laser welding has a convex shape swelling outward. Hence, since a plate thickness of the protruding portion can be increased only in a portion where laser welding is performed, penetration of the welded portion by the laser beam can be suppressed or reduced during laser welding at low cost.

A fourth aspect of the present disclosure provides a novel stator, in which a tip surface of the protruding portion has a greater thickness in a widthwise center in a direction intersecting with the laser emitting direction than the plate thickness of the main body portion. Further, the tip surface of the protruding portion has a thickness less than the plate thickness of the main body portion at at least one end position thereof in the direction intersecting with the laser emitting direction.

Hence, according to the fourth aspect of the present disclosure, a periphery of the tip surface of the protruding portion intersecting with the laser irradiation direction has a convex shape swelling outward. Furthermore, at the widthwise central position in the direction intersecting with the laser irradiation direction, a thickness is made thicker than the plate thickness of the main body portion. At the same time, at each of widthwise end positions of the tip surface in the direction intersecting with the laser irradiation direction, a thickness is less than the plate thickness of the main body portion. Hence, the heat capacity at the welded portion can be reduced. Accordingly, the laser beam can be effectively prevented while enabling welding at relatively low energy.

A fifth aspect of the present disclosure provides a novel stator, in which the stator core has multiple slots arranged in the circumferential direction at a given interval of a rotation angle. The stator windings are composed of phase windings for each phase. Each of the phase windings for each phase has a conductor arranged in slots as a slot accommodating coil portion at a given coil pitch in the circumferential direction. Each of portions of the conductor in another coil end portion is extended oblique to the axial direction and is folded back at a given top position thereof in a middle portion of the phase winding. Further, a portion of the conductor in the coil end portion of a winding end of the phase winding is extended inclining to the axial direction in the same direction as the conductor arranged in the middle portion of the phase winding. Further, an irradiation surface formed on the protruding portion to be irradiated with a laser beam during laser welding has substantially the same shape as an outer surface formed on the conductor of the winding end of the phase winding.

Hence, according to the fifth aspect of the present disclosure, the conductor of the winding end of the phase winding is extended oblique to the axial direction in the coil end portion as same as the middle portion of the phase winding. Further, the irradiation surface of the protruding portion of the busbar, irradiated with a laser beam during laser welding has the same shape as the axial outer surface of the winding end of the phase winding. Hence, since the shape of the laser irradiation surface of the protruding portion coincides with the shape of the axial outer surface of the conductor tip portion of the phase winding as a contacting partner (i.e., a target) for the protruding portion, irregular reflection of the laser beam can be suppressed, thereby readily obtaining a preferable welding bead.

A sixth aspect of the present disclosure provides a novel stator, in which the conductor of each of the stator windings is composed of multiple conductor segments connected to each other. A first tip portion of the conductor segment extended in a given circumferential direction at an outside of the stator core in the axial direction and a second tip portion of another conductor segment extended in a direction opposite to the given circumferential direction at the outside of the stator core in the axial direction are joined together in the coil end portion. An axial outer surface of each of first and second tip portions of the conductor segments has a curved shape. Every one of the protruding portions and the tip portions of the conductor segments are joined by laser welding. The irradiation surface formed on the protruding portion has substantially the same shape as the axial outer surface formed on the tip portion of the conductor segment.

Hence, according to the sixth aspect of the present disclosure, the outer surface of the tip portion of the conductor segment in the axial direction (i.e., the opposite surface to the stator in the axial direction) has a curved shape, and the protruding portion of the busbar and the tip portion of the conductor segment are joined together by laser welding. Hence, since the shape of the laser irradiation surface of the protruding portion coincides with the shape of the axial outer side of the tip portion of the conductor segment, irregular reflection of the laser beam can be suppressed or reduced, thereby readily providing a preferable welding bead.

A seventh aspect of the present disclosure provides a novel stator, in which a given number of conductors are arranged in the slot side by side in a diameter direction of the stator core. The conductor and the protruding portion overlap axially with each other. A chamfer portion is formed obliquely to the axial direction on a surface of the protruding portion facing the stator core in the axial direction.

That is, in the slot accommodating coil section of the stator windings, there generally exists a risk that the protruding portion extended radially from the main body portion of the busbar may possibly interfere with the conductor in a configuration in which a given number of conductors are radially arranged side by side in the slot included and the conductor and the protruding portion overlap axially with each other. Hence, according to the seventh aspect of the present disclosure, since the chamfer portion is formed oblique to the axial direction on the surface facing the stator core in the axial direction, interference between the protruding portion of the busbar and the conductor can be suppressed or reduced.

An eighth aspect of the present disclosure provides a novel stator, in which the busbar has a flat planar shape formed by applying press molding to a flat plate. The press molding creates a rounded edge on the flat plate as a result of operation. The busbar is connected to the coil end portion with a first surface of the busbar having the rounded edge facing the stator core in a plate thickness direction. The busbar is connected to the coil end portion with a second surface of the busbar opposite to the first surface, facing an opposite direction to the stator core in the plate thickness direction.

Hence, according to the eighth aspect of the present disclosure, since the non-rounded edge surface (i.e., an opposite surface to the surface having the rounded edge) of the radial tip portion of the busbar receives laser irradiation during laser welding, irregular reflection of the laser beam can be effectively suppressed, and a problem, such as shallow penetration, etc., can be suppressed or reduced at the same time.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
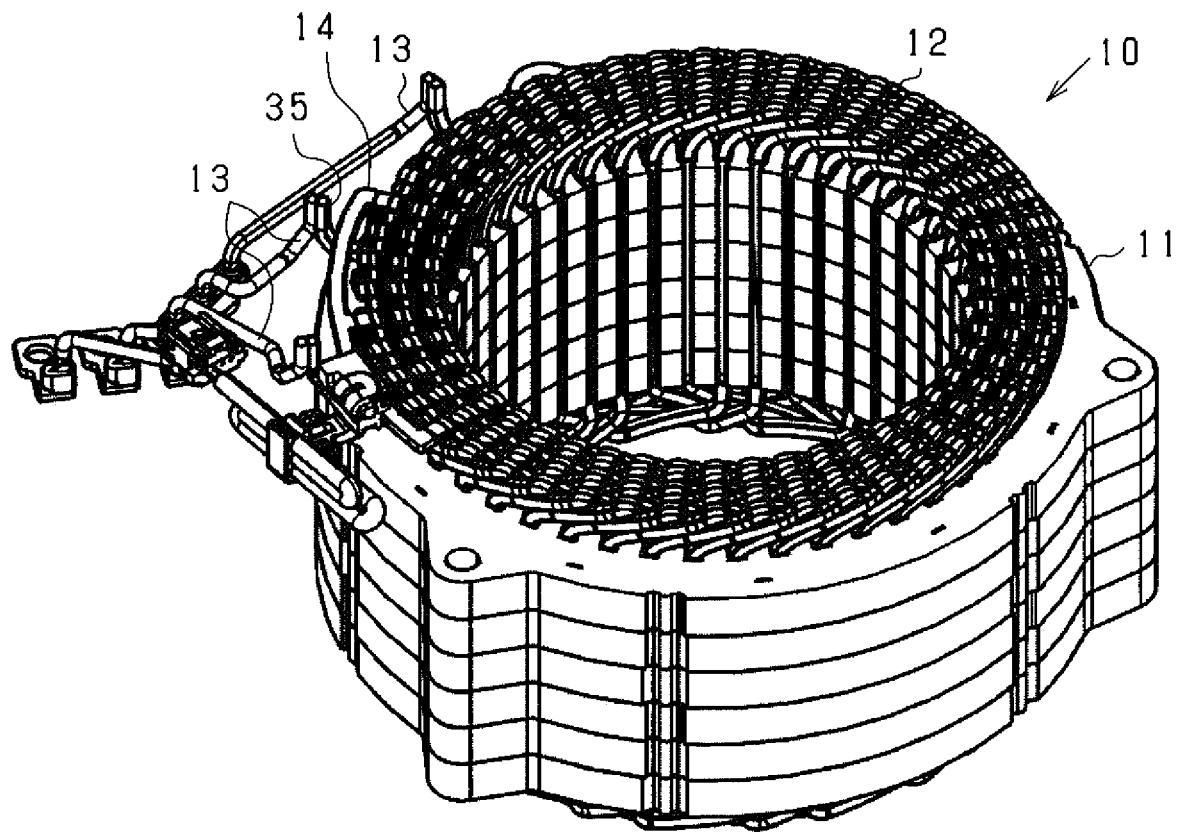
FIG. 1 is a perspective view schematically illustrating an exemplary stator according to one embodiment of the present disclosure.

Referring now to the drawings, wherein like reference numerals designate identical or corresponding parts throughout the several views thereof and to FIG. 1 and subsequent drawings, an exemplary rotating electric machine according to one embodiment of the present disclosure will be hereinbelow described.

In this embodiment, a motor serving as a rotating electric machine is used as an electric motor for either a vehicle or an aircraft, for example.

The rotating electric machine of the present disclosure is a type that employs a three-phase winding, and is applicable to a permanent magnet synchronous motor, a winding field type synchronous motor, and an induction machine. Specifically, as shown in FIG. 1, the rotating electric machine comprises a cylindrical stator 10 and a rotor (not illustrated) disposed radially inside of the stator 10. The rotor is rotatably disposed around a rotation axis facing the stator 10. Hereinbelow, an axial direction indicates an axial direction of the stator 10. That is, it indicates a direction of a rotation axis of the rotor. Further, a radial direction indicates a radial direction of the stator 10. That is, it indicates a direction perpendicular to the rotation axis of the rotor. Further, a circumferential direction indicates a circumferential direction of the stator 10. That is, it indicates a circumferential direction in which things orbit a center of the rotor around the rotation axis thereof.

Figure 2:
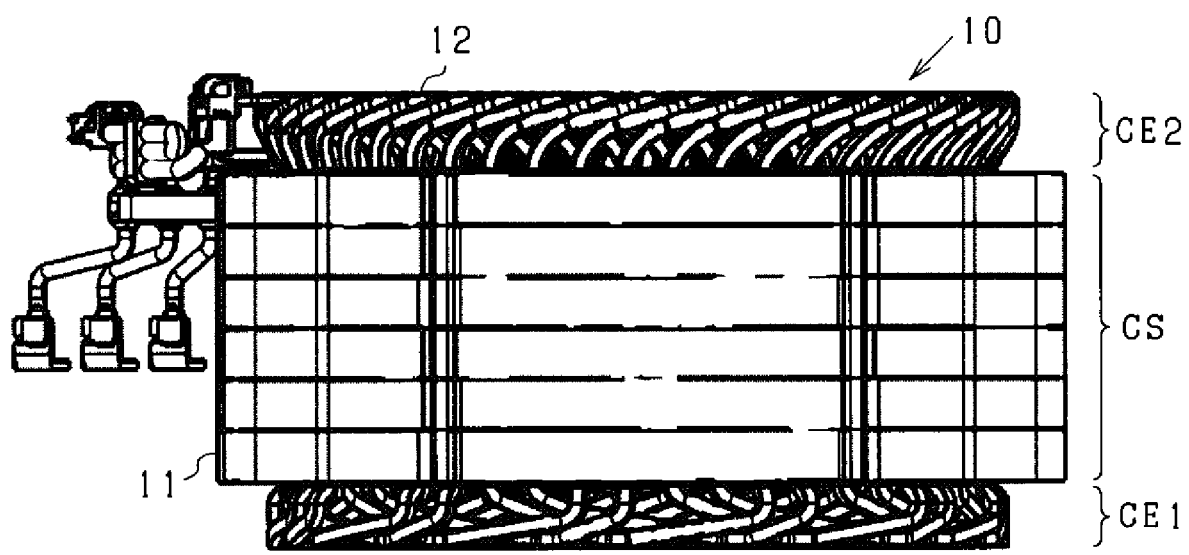
FIG. 2 is a front view illustrating the stator of FIG. 1.

As shown in FIGS. 1 and 2, the stator 10 comprises a stator core 11 having an annular shape and a stator windings 12 wound around the stator core 11. The rotating electric machine of this embodiment is an inner rotor type rotary electric machine. Thus, the rotor is rotatably arranged radially inside of the stator 10. The stator winding 12 is composed of three-phase windings composed of a U-phase winding, a V-phase winding, and a W phase winding arranged phase-by-phase. Hence, a power line busbar 13 is connected to one end of each of windings of respective phases. At the same time, a neutral point busbar 14 is also connected to another end of the windings of the respective phases. As shown, a range of the stator windings 12 overlapping with the stator core 11 in the axial direction serves as a slot accommodating coil portion CS. Both side portions of the stator winding 12 in the axial direction located outside the stator core 11 in the axial direction serve as coil end portions CE1 and CE2, respectively.

Figure 3:
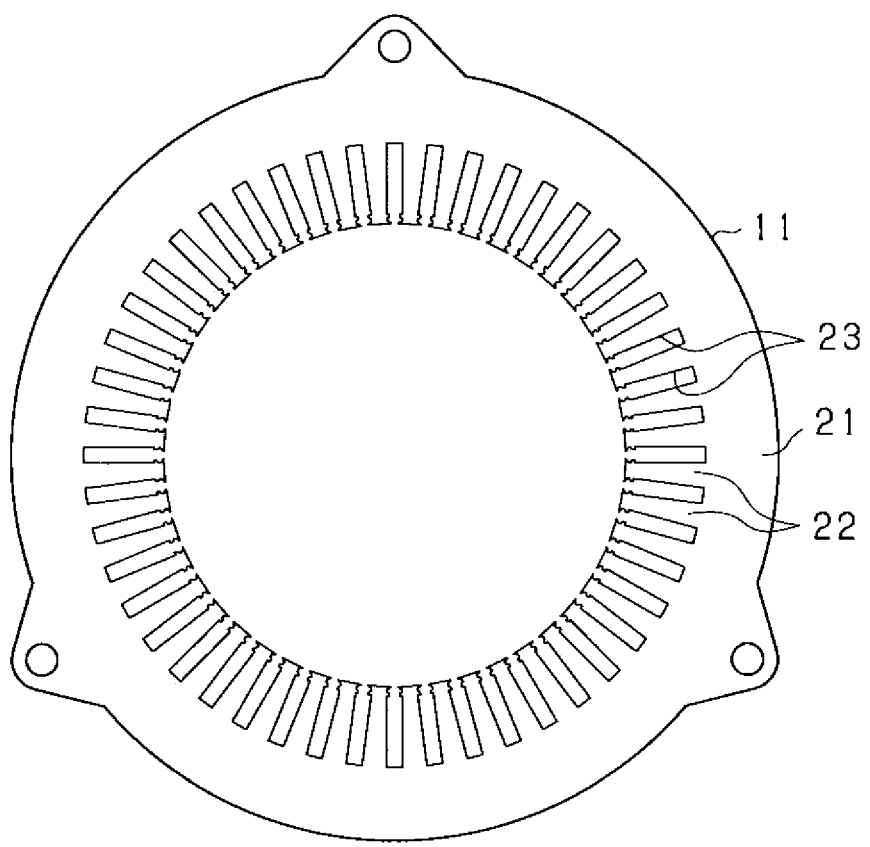
FIG. 3 is a plan view illustrating a stator core included in the stator of FIG. 1.

Further, as shown in FIG. 3, the stator core 11 has an annular back yoke 21. The stator core 11 also has multiple teeth 22 arranged in the circumferential direction at a given interval protruding from the back yoke 21 in the radial direction. Hence, a slot 23 is formed between adjacent two teeth 22. The slot 23 has an opening extended in the radial direction as a longitudinal direction thereof, and is arranged at the same intervals in the circumferential direction in the stator core 11. Then, a stator winding 12 is wound around given teeth in corresponding slots 23. The stator core 11 is configured as a core sheet laminate body formed by axially stacking core sheets, for example, made of electromagnetic steel as a magnetic member.

Here, the stator windings 12 are configured by connecting three-phase windings by using Y-letter wire connection (i.e., star-shaped wire connection). The stator windings 12 generate magnetic fluxes upon receiving power (i.e., AC power) from power supplies via inverters (each, not shown). Further, each of the stator windings 12 is composed of multiple conductor segments 30 as divided conductors. That is, each of the conductor segments 30 is obtained by molding an electric conductor substantially to have a U-shape. The electric conductor has a constant thickness with a substantially rectangular cross section (i.e., flat cross section). A structure of the segment of the stator winding 12 will be described hereinbelow more in detail.

Figure 4:
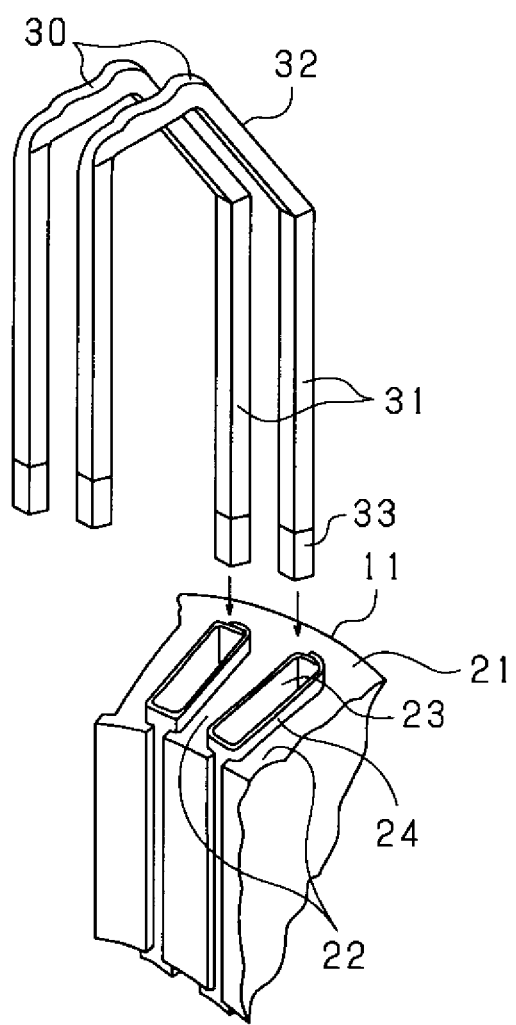
FIG. 4 is a perspective view illustrating an exemplary conductor segment and a part of the stator core according to one embodiment of the present disclosure.

FIG. 4 is a perspective view illustrating conductor segments 30 and a part of the stator core 11. As shown in FIG. 4, each of the conductor segments 30 substantially has a U-shape and is composed of a pair of linear segment portions 31 extended linearly. The conductor segment 30 also has a turn portion 32 bent to connect the pair of linear segment portions 31 each other therebetween. The pair of linear segment portions 31 is longer than a thickness of the stator core 11 in the axial direction. The conductor segment 30 is prepared by using a flat conductor wire. The flat conductor wire is produced by coating a conductor having a rectangular cross-section (i.e., a conductor having a pair of opposing flat portions) with an insulating coat. A portion of the insulating coat covering a tip portion of each linear segment portion 31 is excised (i.e., cut and removed) therefrom, thereby providing a conductor exposed portion 33 at the tip portion.

Then, multiple conductor segments 30 are inserted into given slots 23 of the stator core 11, and are radially aligned in a row therein. In this embodiment, six layers of linear segment portions 31 of the conductor segments 30 are accommodated in the slots 23 as a laminate. The pair of linear segment portions 31 of the conductor segment 30 is housed in given two slots 23 separated by a given coil pitch, respectively. Among the entire portion of the linear segment portion 31, a portion accommodated in the slot 23 corresponds to a slot accommodating coil portion CS of the stator winding 12. Here, in the slot 23, an insulating sheet 24 is provided to electrically insulate the stator core 11 from the stator winding 12 (i.e., the conductor segment 30). Specifically, the insulating sheet 24 is disposed in the slot 23 between an inner peripheral surface (i.e., an inner wall surface) of the stator core 11 and the conductor segment 30 and is folded completely to surround multiple conductor segments 30 inserted into the slot 23.

Figure 8:
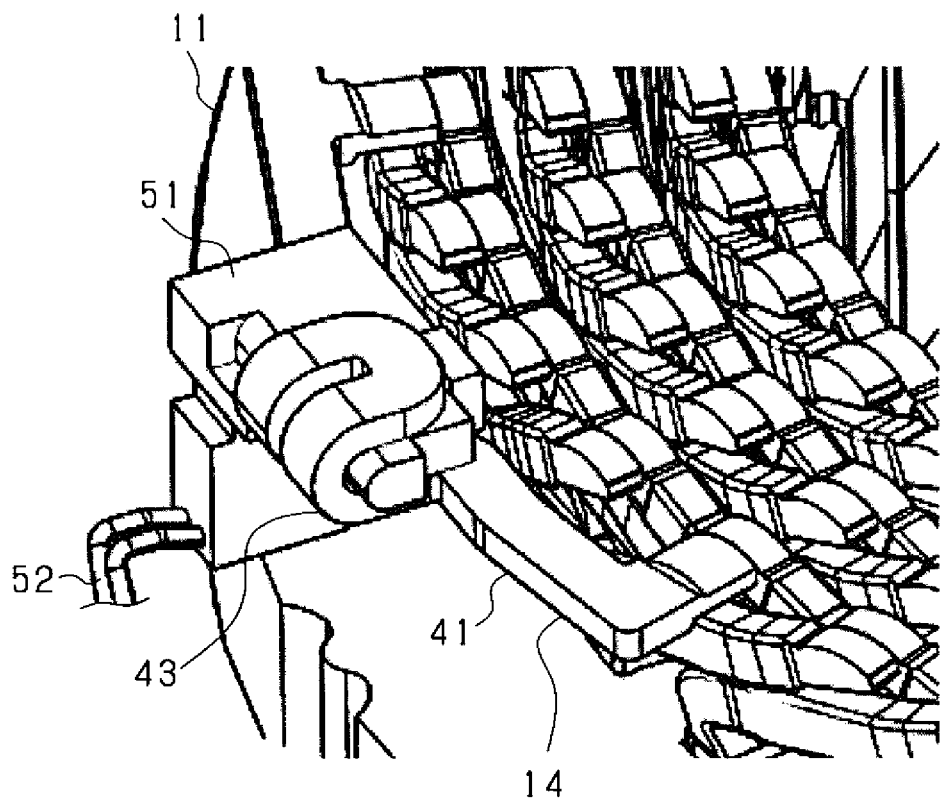
FIG. 8 is a perspective view illustrating an assembled state in which a temperature sensor module and the neutral point busbar are assembled according to one embodiment of the present disclosure.

Further, the pair of linear segment portions 31 of the conductor segment 30 are positioned in the two respective slots 23 by relatively shifting a radial position by an amount of one coil. For example, as shown in FIG. 8, when one of the linear segment portions 31 is accommodated at a n-th position counted from a radial back side (i.e., a side of the back yoke), the other one of the linear segment portions 31 is accommodated at a n+1-th position counted from the radial back side.

Further, each conductor segment 30 is inserted into given slots 23 of the stator core 11 as described below. That is, the linear segment portion 31 of each conductor segment 30 is inserted from a first end side of the stator core 11 out of first and second end sides respectively located at both ends of the stator core 11 in the axial direction. Then, a tip portion of each of the linear portions 31 protrudes from the second end side of the stator core 11. With this, facing the first end of the stator core 11, one of the coil end portions CE1 is formed by the turn portions 32 of the conductor segments 30. By contrast, facing the second end of the stator core 11, the other one of the coil end portions CE2 is formed. That is, in the coil end portion CE2, an opposite end portion (hereinafter simply referred to as a non-turn portion) of each linear segment portion 31 opposite to the turn portion 32 is bent in a circumferential direction and connected to a linear segment portion 31 of another conductor segment 30. Each of the coil ends CE1 and CE2 is schematically illustrated in FIG. 2.

Next, an exemplary connection process of connecting conductor segments 30 in the coil end portion CE2 will be hereinbelow described in more detail. Initially, the exemplary connection process performed between conductor segments 30 will be briefly described.

Figure 5:
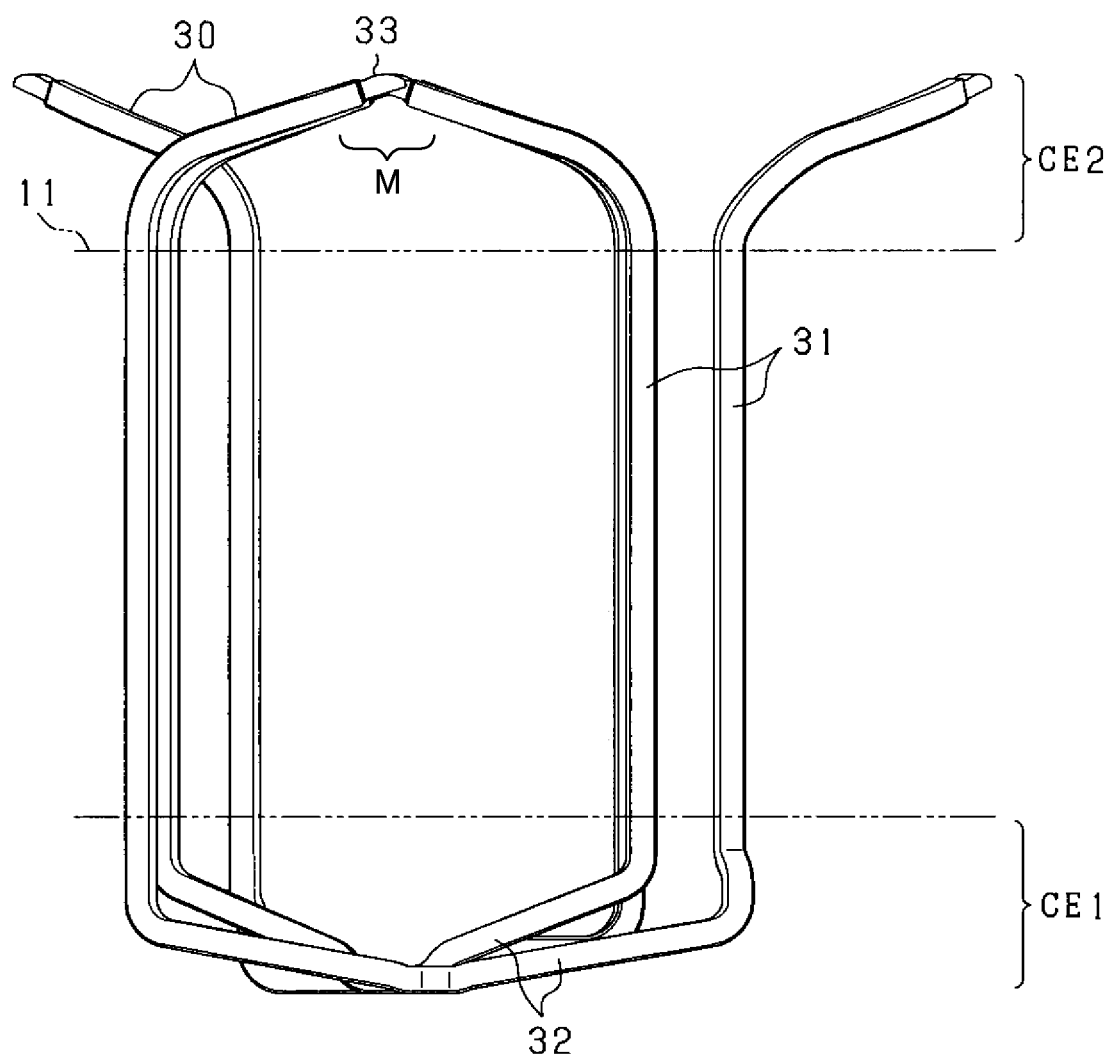
FIG. 5 is a diagram illustrating a part of the conductor segment housed in slots of the stator core according to one embodiment of the present disclosure.

FIG. 5 is a diagram partially illustrating conductor segments 30 housed in given slots 23. In the drawing, four layers of conductor segments 30 are employed and the stator core 11 is shown by virtual lines, for convenience. As shown, non-turn portions of a pair of linear segment portions 31 of the conductor segment 30 protrude from the axial end face (i.e., an upper end face in the drawing) of the stator core 11. the non-turn portions of the pair of linear segment portions 31 are then obliquely bent in the circumferential direction at a given angle formed from the core end face. Then, conductor exposed portions 33 located at tip portions of different conductor segments 30 respectively are joined together by welding, thereby causing the multiple conductor segments 30 to connect to each other.

Further, in the coil end portion CE2, a tip portion of the conductor segment 30 extended in a first circumferential direction at an outside of the stator core 11 in the axial direction and a tip portion of the other conductor segment 30 extended in a second circumferential direction opposite to the first circumferential direction are joined together. With this, in the coil end region CE2, a tip portion of the linear segment portion 31 of the conductor segment 30 of the stator winding 12 extends obliquely against the axial direction and is folded back (i.e., turned) at a given top position. Further, each of the linear segment portions 31 of the conductor segment 30 is bent differently as described below. That is, a linear segment portion 31 on a side of the non-turn portion is bent on the same side in the circumferential direction as the turn portion 32. By contrast, another linear segment portion 31 on a side of the non-turn portion is bent in the circumferential direction opposite to a direction in which the turn portion 32 is bent.

Figure 6A:
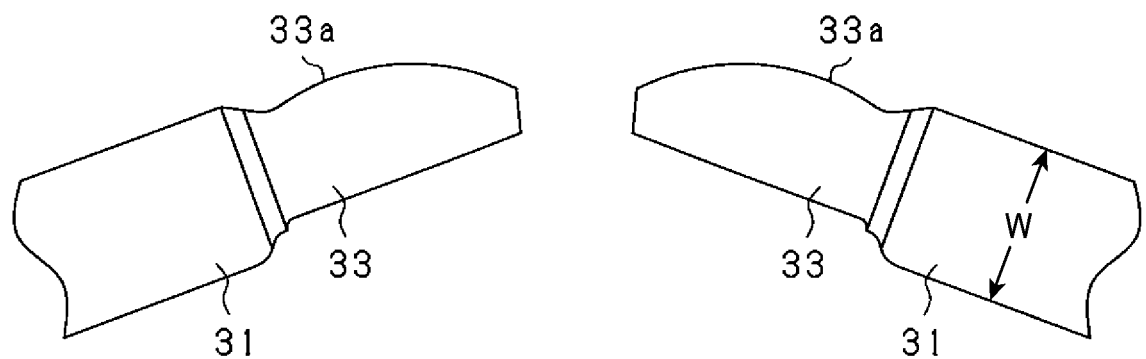
FIGS. 6A and 6B are diagrams collectively illustrating a connection process of connecting conductor segments according to one embodiment of the present disclosure.
Figure 6B:
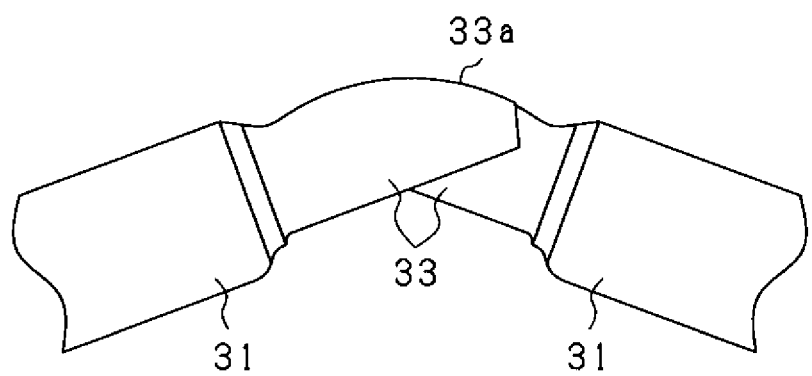

Next, an exemplary connection process in which conductor segments 30 are mutually connected will be hereinbelow described with reference to FIGS. 6A and 6B. FIG. 6A is an expanded view illustrating conductor exposure portions 33 exposed from the linear segment portions 31 of the respective conductor segments 30. FIG. 6B also illustrates the conductor exposed portions 33 of the conductor segments 30 connecting to each other.

As shown, an axial outer side 33a of the conductor exposed portion 33 of the conductor segment 30 located outside in the axial direction, that is, an upper surface thereof in the drawing provides an arc surface convex protruding outward in the axial direction. Further, each surface of the conductor exposed portion 33 other than the axial outer side 33a, that is, an axial inner side, a radial outer side, and a radial inner side of the conductor exposed portion 33 provide flat surfaces. Then, the conductor exposed portions 33 of the different conductor segments 30 are superimposed radially to be joined together. Subsequently, in such a superimposed condition, the respective conductor exposed portions 33 are joined together, by using, for example, laser welding with the flat surfaces of respective conductor exposed portions 33 contacting each other.

Hence, as described earlier, the outer side 33a of the conductor exposed portion 33 of the conductor segment 30 has an arc surface in an outwardly convex state in the axial direction. Then, the conductor exposed portions 33 are joined together with each axial outer side 33a substantially coinciding with each other. That is, the conductor exposed portions 33 are overlapped with each other and joined together in a thickness direction thereof with central axes of the arcs of the respective outer sides 33a located outside in the axial direction coincide with each other. Here, it is preferable that a radius of the arc of the axial outer side 33a may be greater than a width W of the conductor segment 30.

Further, conductor connection is performed by joining the conductor segments 30 at an intermediate portion M of a coil per phase as shown in FIG. 5. By contrast, a power line busbar 13 for each phase and a neutral point busbar 14 are connected to conductor exposed portions 33 formed at winding end portions. Hereinbelow, a connection mechanism of connecting a neutral point busbar 14 with winding end portions of a phase winding will be especially described in detail.

Figure 7:
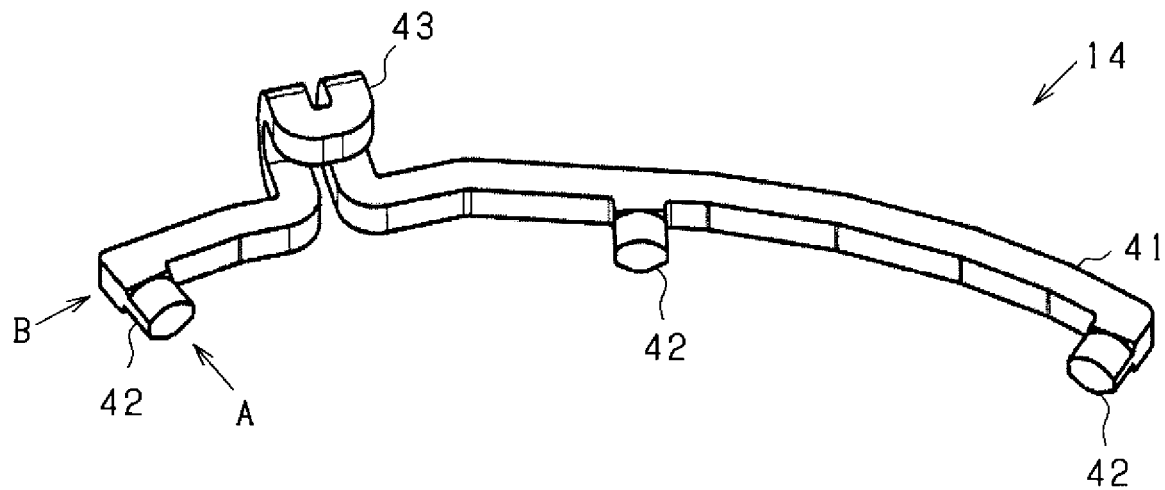
FIG. 7 is a perspective view schematically illustrating an exemplary neutral point busbar arranged at a neutral point according to one embodiment of the present disclosure.

FIG. 7 is a perspective view illustrating a neutral point busbar 14. The neutral point busbar 14 is composed of a flat conductor and includes a long body portion 41 and three protrusions 42 protruding from the long body portion 41. The neutral point busbar 14 is composed of a punching member obtained by punching a flat plate. The main body portion 41 is extended long in an arc state in a plan view. Specifically, in an assembled state in which it is assembled with the stator winding 12, the neutral point busbar 14 has a main body portion 41 extended in the circumferential direction and protrusions 42 extended radially inside from the main body portion 41 as shown in FIG. 1. the three protrusions 42 may be bonded to winding end portions of respective phase windings of u-phase, v phase, and w phase, respectively. In this embodiment, radial tip portions of the protrusions 42 are connected to winding end portions of respective phase windings located in the coil end portion ce2 by laser welding.

Further, the main body portion 41 includes a folding portion 43 formed by folding a part of the flat conductor in radial and axial directions of the stator 10. The folding portion 43 serves as a sensor mounting section for mounting a temperature sensor module 51 thereon, which detects temperature of the stator 10. Specifically, as shown in FIG. 8, the temperature sensor module 51 is attached to the neutral point busbar 14 with it being sandwiched by the folding portion 43. Here, a part of the temperature sensor module 51 protrudes from the main body portion 41 to the stator core 11 to act as a protruding portion. Then, a signal line 52 is connected to the protruding portion.

Further, when the protruding portions 42 of the neutral point busbar 14 are respectively connected to the winding ends by laser welding, each of welded portions is irradiated with a laser beam from a vertically outside of the coil end portion CE2 in the axial direction with the stator windings 12 being attached to the stator core 11. In such a situation, when laser welding is performed, a coat (i.e., an insulating member) on the conductive wire in the coil end portion CE2 is damaged by the laser beam penetrating the welded portion as a risk. In view of this, according to the present disclosure, in order to suppress or reduce penetration of the laser beam at the welded portion, each of the protruding portions 42 of the neutral point busbar 14 is made thicker than the main body portion 41 in a direction in which the welded portion is irradiated with the laser beam during laser welding as described hereinbelow.

Figure 9A:
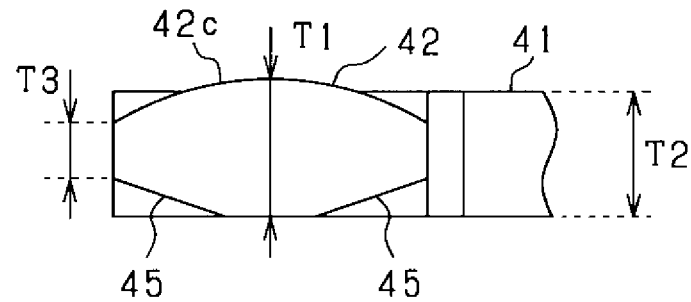
FIGS. 9A and 9B are diagrams collectively illustrating a structure of a protruding portion of the neutral point busbar of FIG. 7.
Figure 9B:
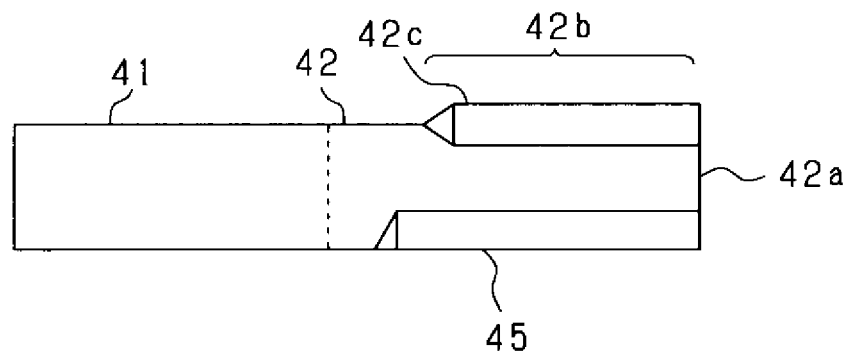

That is, FIG. 9A is a diagram illustrating one of the protruding portions 42 of the neutral point busbar 14 when viewed from a direction A shown in FIG. 7. FIG. 9B is also a diagram illustrating one of the protruding portions 42 when viewed from a direction B shown in FIG. 7. As shown in FIGS. 9A and 9B, a given region of the protruding portion 42 of the neutral point busbar 14 protruding in a prolonging direction including a tip surface 42a constitutes a radial tip portion 42b. Then, a vertical thickness T1 of the radial tip portion 42b, that is, a thickness thereof in the direction in that the radial tip portion 42b is irradiated with a laser beam during laser welding is greater than a plate vertical thickness T2 of the main body portion 41. Here, the plate thickness T2 of the main body portion 41 is equivalent to a thickness of a flat plate to be punched or after being punched.

More specifically, in each of the protruding portions 42, among the total length of the protruding portion 42 extended from the main body portion 41 in an extended direction, a given region starting from the tip surface 42a has a thickness T1 greater than a plate thickness T2 of the main body portion 41 (see FIG. 9B). Further, at a radial tip portion 42b of the protruding portion 42, top and bottom surfaces in the drawing, that is, surfaces that intersect with a laser beam irradiation direction during laser welding are respectively formed in outwardly convex arc shapes as shown in FIG. 9A. Especially, at a widthwise center of the tip surface 42a of the protruding portion 42 in a direction intersecting with the laser beam irradiation direction at the time of laser welding, the thickness T1 is greater than the plate thickness T2 of the main body portion 41. At the same time, at each of widthwise end positions of the tip surface 42a of the protruding portion 42 in the intersecting direction, a thickness T3 thereof is less than the plate thickness T2 of the main body portion 41.

Figure 10A:
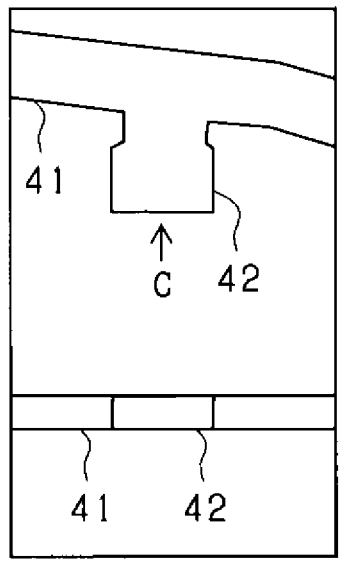
FIGS. 10A to 10C are diagrams illustrating a process of molding the protruding portion of the neutral point busbar of FIG. 7.
Figure 10B:
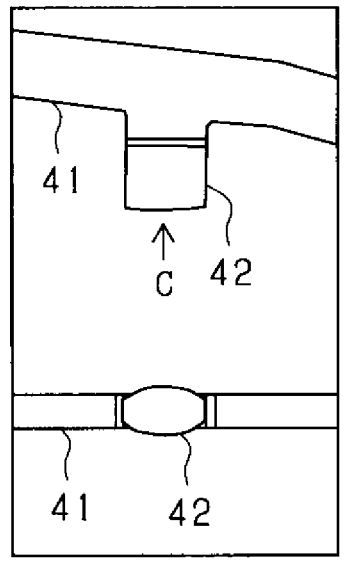

Next, a procedure of molding the protruding portions 42 of the neutral point busbar 14 will be described with reference to FIGS. 10A to 10C. In FIGS. 10A to 10(*c*), upper stages show plan views transition of one of the protruding portions 42, and lower stages show transition of one of the protruding portions 42 viewed in a direction C indicated in the upper stages.

Specifically, FIG. 10A shows a state of one of the protruding portions 42 immediately after punching the flat plate (i.e., a state before molding). Hence, a width of a portion corresponding to the radial tip portion 42b of one of the protruding portions 42 is wider than that after molding. Subsequently, as shown in FIG. 10B, the protruding portion 42 is molded by plastic processing. At this moment, a surplus wide portion of the protruding portion 42 in a widthwise direction thereof is symmetrically crushed by using a given pressing jig, thereby molding it into a swelling portion swelling in a thickness direction thereof. Hence, with this plastic processing, a vicinity of a joint surface joining the protruding portion 42 to the conductor exposed portion 33 is hardened, thereby increasing mechanical strength of a welded portion.

Figure 10C:
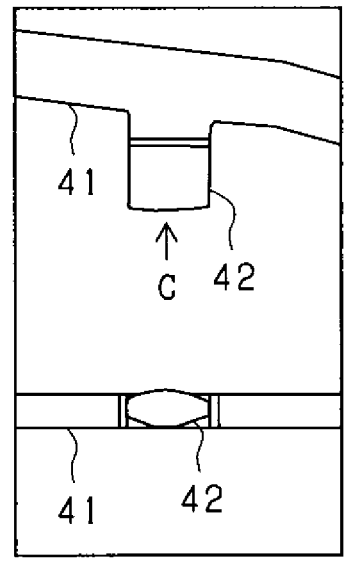

Subsequently, as shown in FIG. 10C, the swelling portions in the thickness direction are finished and processed to have given sizes, respectively. Hence, the protruding portion 42 having a desired shape and a dimension is obtained. Here, in the finishing process, the dimension of the protruding portion 42 is adjusted by cutting and/or polishing thereof. However, such an adjustment can be omitted and the protruding portion 42 shown in FIG. 10C can be obtained simply by molding thereof.

Figure 11A:
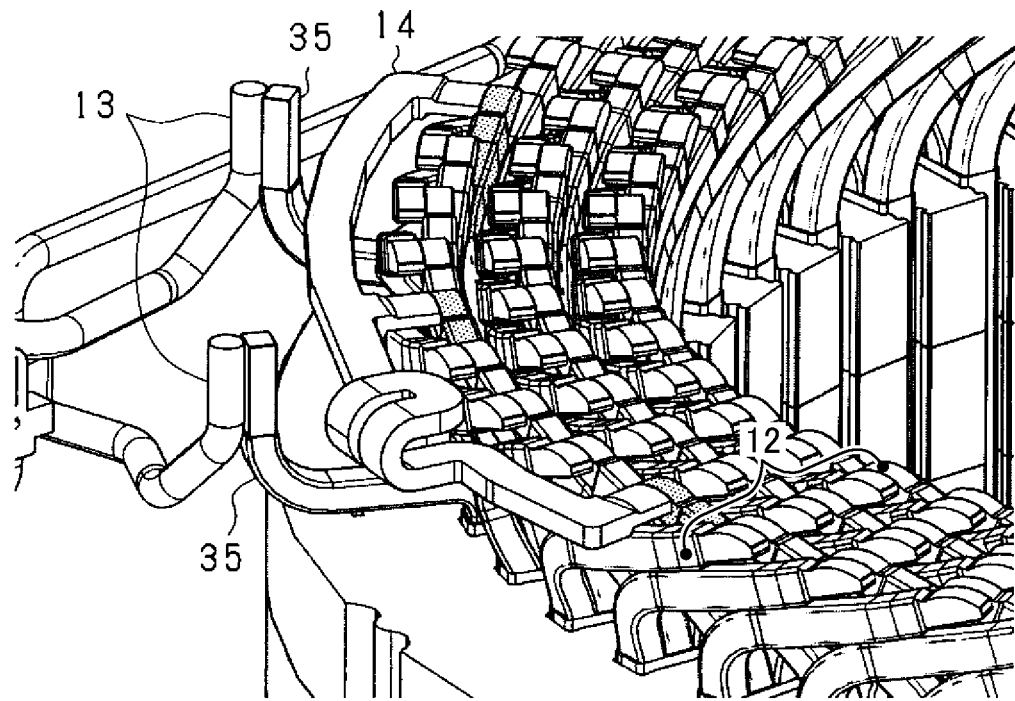
FIGS. 11A and 11B are perspective views collectively illustrating an exemplary connected state of the neutral point busbar connecting to stator windings according to one embodiment of the present disclosure.
Figure 11B:
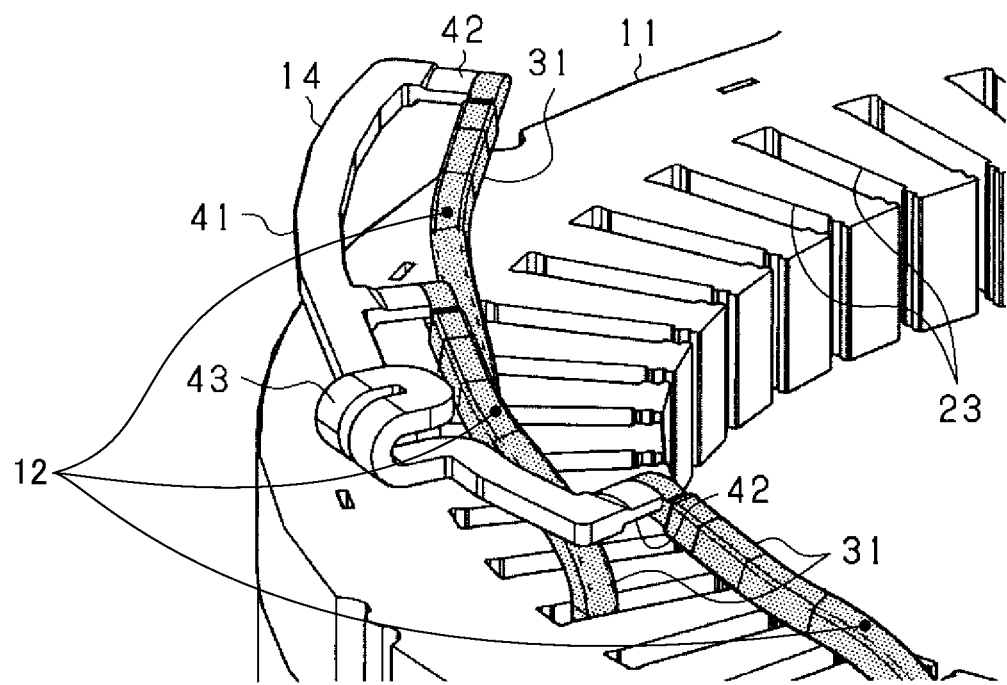

FIGS. 11A and 11B are diagrams collectively illustrating a connected state of a neutral point busbar 14 connecting to the stator windings 12. Specifically, FIGS. 11A and 11B each shows the same basic configuration of the connected state of the neutral point busbar 14 connecting to the stator windings 12. However, in FIG. 11B, out of multiple conductor segments 30, only a conductor segment 30 serving as an end portion of each of phase windings is shown. Hence, for convenience, conductor segments 30 to be connected as connection targets to the neutral point busbar 14 are shaded in each of the drawings.

As shown in FIGS. 11A and 11B, the non-turn portion of the linear segment portion 31 of the conductor segment 30, that is, a portion including a winding end portion of a phase winding (e.g., a U-phase winding (the same in the other phases)) is extended in the peripheral direction of the stator core 11. Then, the neutron point busbar 14 is connected to the winding end portions of the phase windings. That is, in the coil end portion CE2, similar to a middle portion of the phase winding, that is, portions where conductor segments 30 are mutually connected, a tip portion of a non-turn portion of a linear segment portion 31 of a conductor segment 30 is extended in the circumferential direction inclining in the axial direction. Then, each protruding portion 42 of the neutral point busbar 14 is connected to a conductor exposed portion 33 of each linear segment portion 31 per phase.

Further, similar to the portion as described earlier with reference to FIG. 6A, an axially outer side surface 33a of the conductor exposed portion 33 of the conductor segment 30 again has an outwardly convex arc surface in the axial direction. Further, a laser beam irradiation surface 42c formed in a radial tip portion 42b of the protruding portion 42 of the neutral point busbar 14 to act as a laser beam irradiation side at a time of laser welding has an outwardly convex arc shape as shown in FIG. 9A. Furthermore, a shape of the laser beam irradiation surface 42c of the protruding portion 42 and a shape of the axial outer side surface 33a of the tip portion of the conductor segment 30 are substantially the same. Hence, at the joining portion joining the conductor exposed portion 33 of the conductor segment 30 and the protruding portion 42 of the neutral point busbar 14 together, outside surfaces in the axial direction substantially coincide with each other, thereby making a common surface as described hereinbelow.

Figure 12:
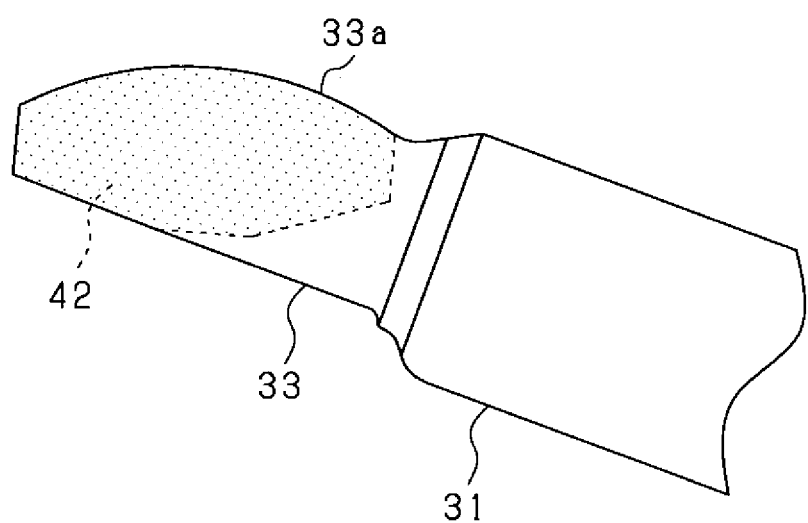
FIG. 12 is a diagram illustrating a region where the busbar protrusion is connected to a conductor exposure portion where the conductor segment is not covered by the coating and exposed according to one embodiment of the present disclosure.

FIG. 12 illustrates a region of the conductor exposed portion 33 of the conductor segment 30 connected to one of the protruding portions 42 of the neutral point busbar 14. In the drawing, a shade is applied to a portion of the conductor exposed portion 33 of the conductor segment 30 connected to the neutral point busbar 14. Then, as shown, a shape of the axial outer side surface 33a of the conductor exposed portion 33 and a shape of the laser beam irradiation surface 42c of the protruding portion 42 coincide with each other, thereby making a common surface.

Figure 13:
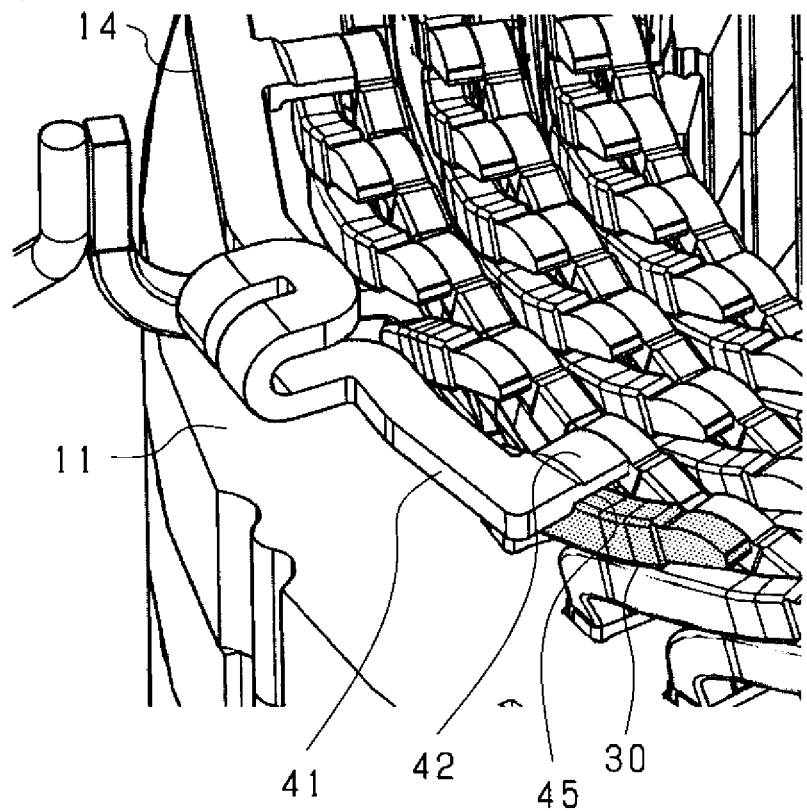
FIG. 13 is a perspective view illustrating a connected state of the neutral point busbar connecting to stator windings according to one embodiment of the present disclosure.

Further, in the slot accommodating coil portion CS of the stator windings 12, a given number of conductor segments 30 is arranged side by side in the radial direction in the slot 23. Specifically, a conductor segment 30 of the same phase is extended over two (e.g., neighboring) slots 23 and is accommodated in these slots 23 at respective positions thereof. However, one of the positions of the slots 23 is radially shifted by one step from the other one of the positions. Hence, in such a situation, in the coil end portion CE2, as shown in FIG. 13, the protrusion 42 extended radially from the main body portion 41 of the neutral point busbar 14 intersects in the axial direction with another conductor segment 30 extended inclining in the axially direction (i.e., a shaded conductor segment 30) different from a connection partner (i.e., target). Hence, there is a risk that the protruding portion 42 of the neutral point busbar 14 may interfere with the conductor segment 30.

In view of this, according to this embodiment, an oblique chamfer portion 45 is formed obliquely to the axial direction on a surface of the protruding portion 42 facing the stator core 11 in the axial direction (i.e., an inside surface in the axial direction), so that the chamfer portion 45 can suppress axial interference between the protruding portion 42 and the conductor segment 30 as described hereinbelow.

That is, FIGS. 9A and 9B collectively show the chamfering portion 45 formed in the protruding portions 42. As shown, in the protruding portion 42, the chamfer portion 45 is located on an opposite side to the laser beam irradiation surface 42c. Further, as shown in FIG. 9B, the chamfer portion 45 is located within a given region from the tip surface 42a in an extending direction of the protruding portion 42. In other words, a range from the tip surface 42a in which the chamfer portion 45 is located is wider than a range therefrom in which the radial tip portion 42b is located. However, the chamfer portion 45 and the radial tip portion 42b can be located in the same range from the tip surface 42a.

Figure 14:
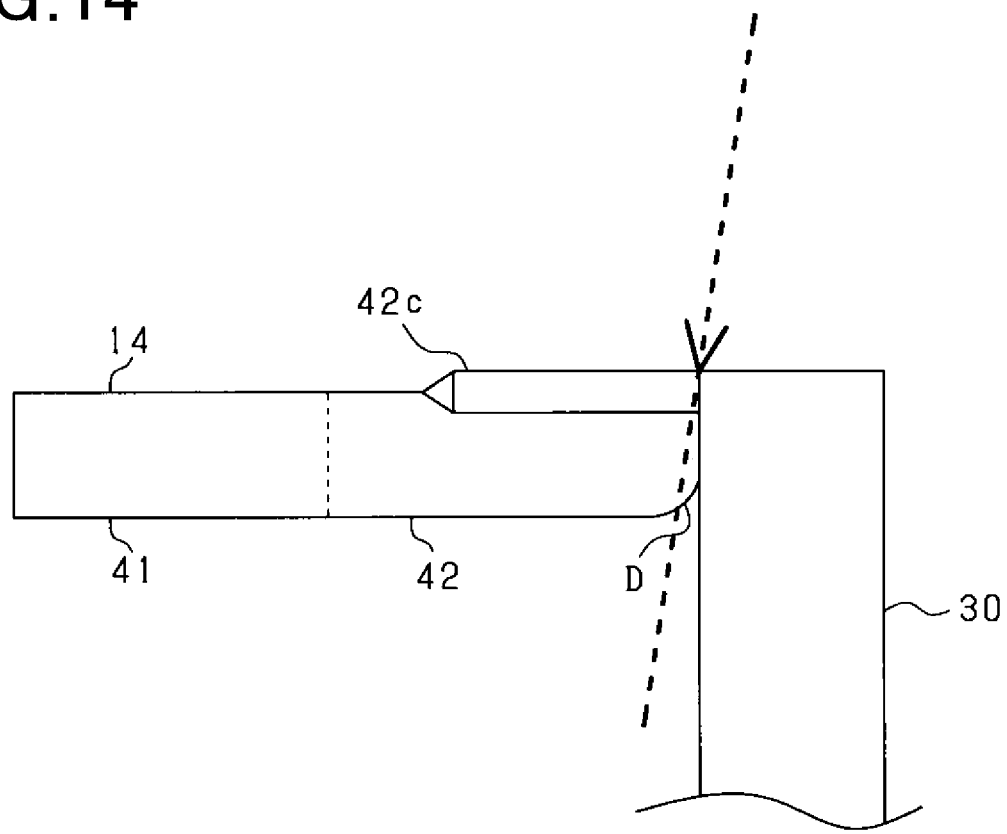
FIG. 14 is a diagram illustrating the neutral point busbar and the conductor segment subjected to a laser welding process according to one embodiment of the present disclosure.

Further, the neutral point busbar 14 is prepared by punching a flat plate member in a flat plate shape by using press molding. Hence, as shown in FIG. 14, the neutral point busbar 14 generally has a rounded edge D at a periphery thereof caused by such press molding. That is, in FIG. 14, a portion indicated by a letter D represents the rounded edge (i.e., a rounded part). In addition, when the neutral point bus bar 14 is punched by pressing in this way, burrs are also generally generated on a side (hereinafter simply referred to as a non-rounded side) opposite to the side having the rounded edge. Hence, when a side of the protruding portion 42 of the neutral point busbar 14 with the rounded edge is irradiated with a laser beam, the laser beam possibly causes irregular reflection at a thin portion with a thickness being reduced by the rounded edge, thereby causing shallow melting as a problem.

In view of this, as shown in FIG. 14, the non-rounded side of the neutral point busbar 14 is thus used as the laser beam irradiation surface 42c to be irradiated with a laser beam and cause laser welding in the protruding portion 42. That is, the neutral point busbar 14 is connected to the coil end portion CE2 while the rounded edge side surface faces the stator core 11, and the non-rounded side is directed opposite to the stator core 11 along the plate thickness direction. Further, it is preferable in such a situation that a welding bead is formed to pass through an edge line formed at an edge of the non-rounded side.

Next, connection of power line busbars 13 connecting to stator windings 12 respectively will be hereinbelow described with reference to FIGS. 15 and 16. As shown in FIGS. 1 and 11A, in the phase winding of each phase, a winding end portion 35 is located opposite to a neutral point of the phase winding, and protrudes radially outward from the coil end portion CE2. Then, the power line busbars 13 for respective phases are then connected to the winding end portions 35. Hence, it is also preferable for the phase windings and the power line busbars 13 to be respectively connected by laser welding with each other.

Figure 15:
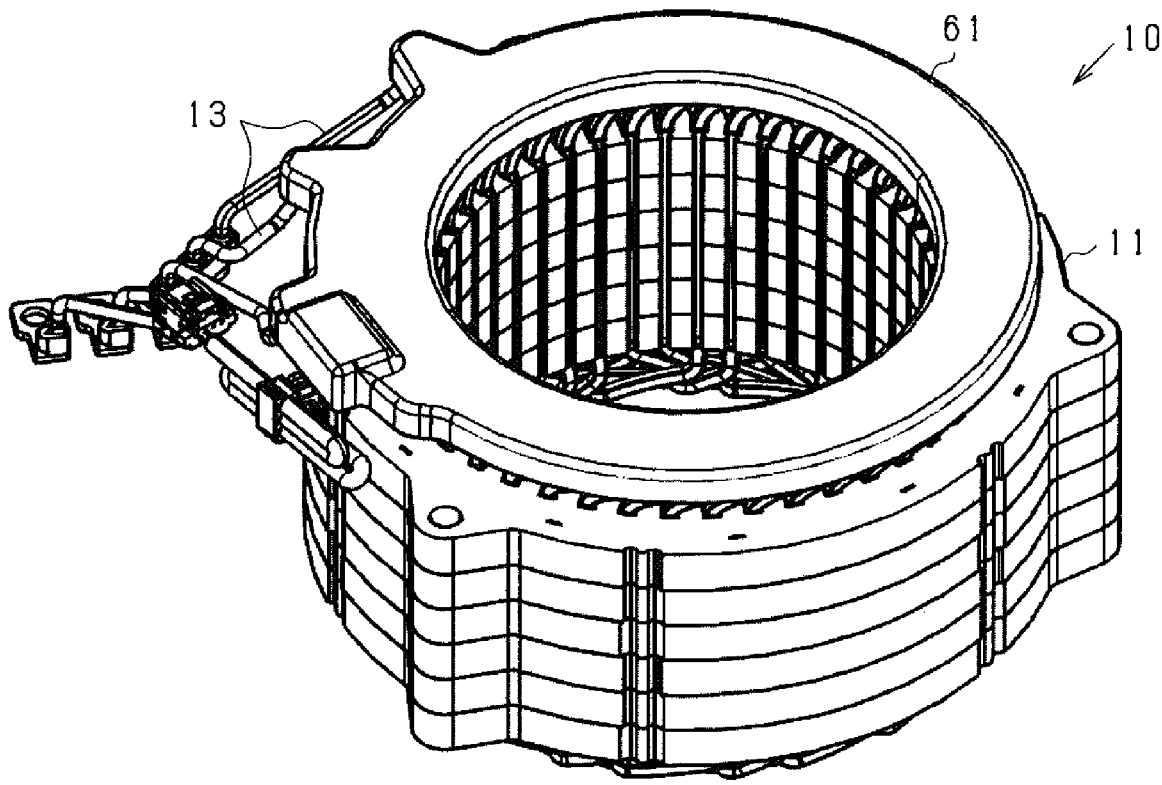
FIG. 15 is a perspective view illustrating another stator according to one embodiment of the present disclosure.
Figure 16:
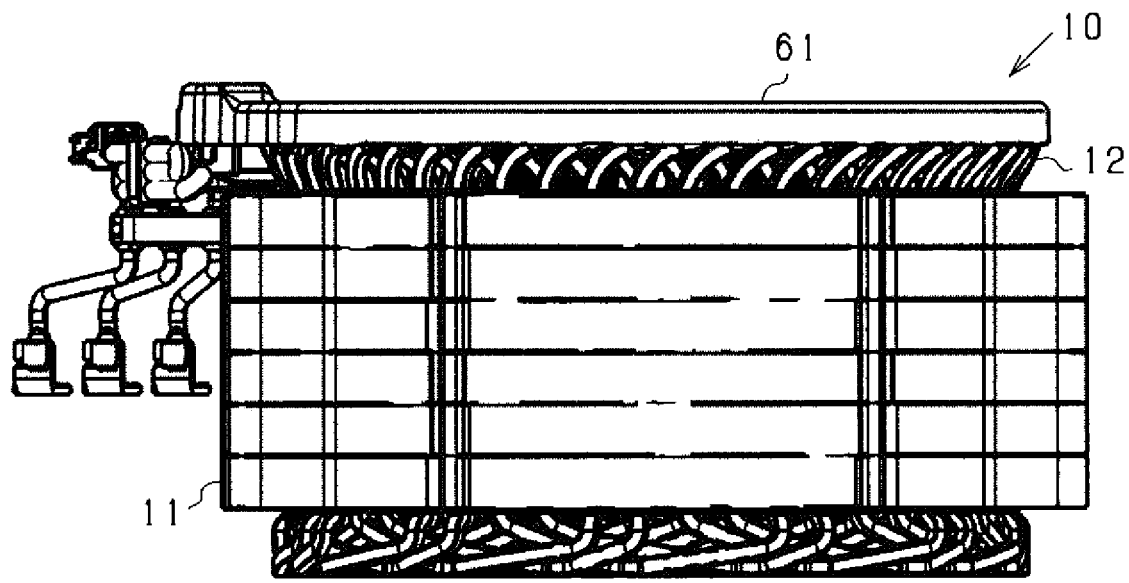
FIG. 16 is a front view illustrating the stator of FIG. 15.

Further, the coil end portion CE2 may be sealed by insulating resin as shown in FIGS. 15 and 16. That is, as shown in each of drawings, a resin sealing member 61 having an annular shape is disposed in the coil end portion CE2. That is, the resin sealing member 61 in the annular state may cover welded portions (i.e., tops of turns of conductors) of conductor segments 30, the neutral point busbar 14, and welded portions joining phase windings and the power line busbars 13.

More specifically, the resin sealing member 61 partially covers the coil end portion CE2 in the axial direction. That is, as shown, the coverage in the axial direction includes the welding portions mutually joining conductor segments 30 and is extended up to a given vertical position separated from an axial end face of the stator core 11. With this, since there exists a region not sealed by resin between the resin sealing member 61 and the core end face, such a region can be used as a coil cooling section for cooling the stator windings 12. As for a cooling system of cooling the stator windings 12, cooling by a refrigerant, such as cooling oil (i.e., oil cooling), cooling water (i.e., water cooling), etc., or cooling by air (i.e., air cooling) can be employed.

Further, the temperature sensor module 51 assembled into the neutral point busbar 14 is similarly covered with the resin sealing member 61. However, some portions including a connection portion connecting the temperature sensor module 51 with the signal line 52 (see FIG. 8) is disposed outside of the resin sealing member 61.

Figure 17:
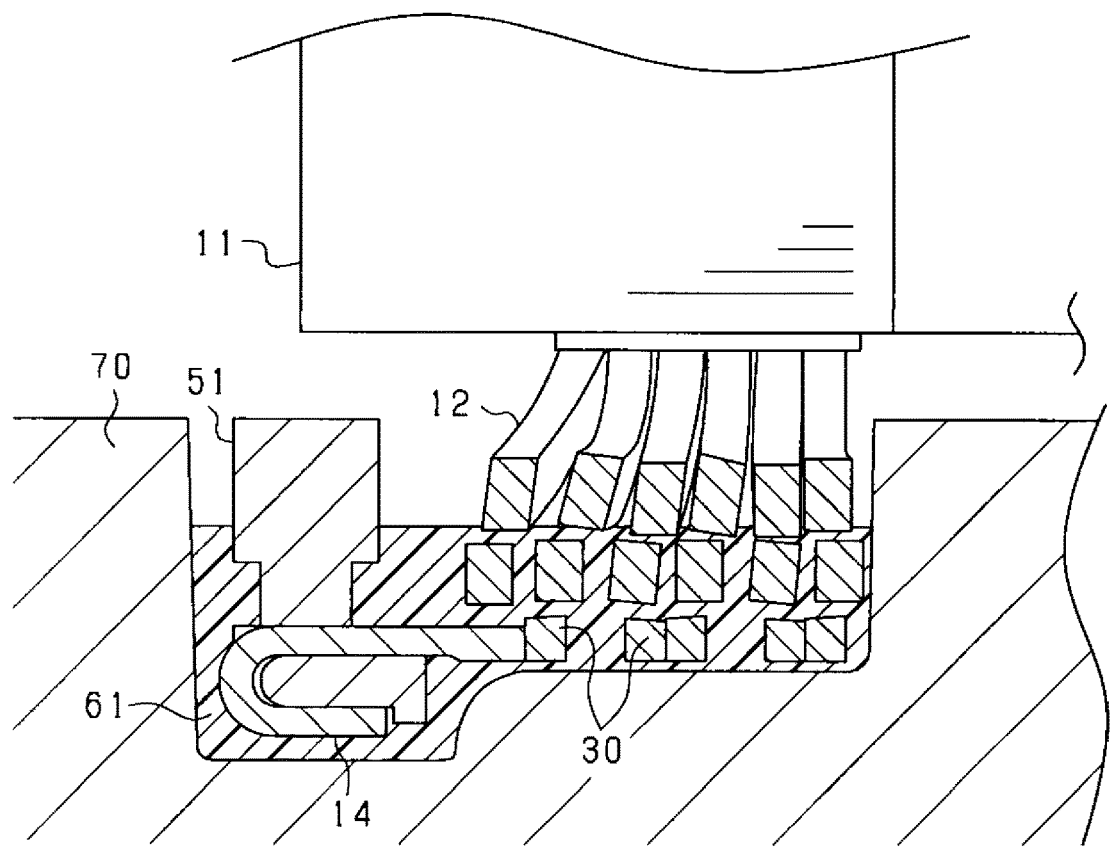
FIG. 17 is a diagram illustrating a molding process of molding a resin seal portion provided in a coil end portion according to one embodiment of the present disclosure.

FIG. 17 is a diagram illustrating a molding process of molding the resin sealing member 61 partially covering the coil end portion CE2. That is, the resin sealing member 61 is molded after each of the busbars 13 and 14 is connected to the coil end portion CE2 of the stator windings 12. When it is molded, the coil end portion CE2 is inserted into a mold 70 in which liquid resin material is stored. Then, the resin sealing member 61 is molded in the mold 70.

According to the above-described embodiment, at least one of the following advantages can be obtained.

First, since the thickness T1 of the protruding portion 42 of the neutral point busbar 14 in the direction in which a laser beam is emitted during laser welding is made greater than the plate thickness T2 of the main body portion 41 thereof, the laser beam can be suppressed from penetrating a welded portion in the protruding portion 42. Besides, since it becomes unnecessary to reduce a strength of irradiation of the laser beam or to shift a focus thereof, a productivity can be maintained. As a result, the neutral point busbar 14 is readily connected to the coil end portion CE2 of the stator windings 12 by laser welding.

Further, in each of the protruding portions 42 of the neutral point busbar 14 extended from the main body portion 41, a given region as a part of the total length rage thereof starting from the radial tip surface 42a has a greater thickness T1 than the plate thickness T2 of the main body portion 41 thereof. Further, among the total range of the protruding portion 42 extended from the main body portion 41 in the extending direction, a thickness T1 in the direction in which the protruding portion 42 is irradiated with a laser beam increases only in a range necessary for receiving irradiation of the laser beam. Hence, an increase in heat capacity in the radial tip portion 42b (i.e., a welded portion) of the protruding portion 42 can be effectively minimized, thereby suppressing penetration of the laser beam without impeding weldability therein.

Further, a surface of each of the protruding portions 42 of the neutral point busbar 14 intersecting with a laser beam irradiation direction during laser welding has outwardly convex shapes. Hence, since a plate thickness can be increased only in a portion of the protruding portion 42 where laser welding is performed, laser beam penetration of penetrating a welded portion during laser welding can be effectively suppressed or reduced while avoiding or reducing cost increase.

Further, at an edge of the tip surface 42a of the protruding portion 42, a periphery of the edge intersecting with the laser beam irradiation direction is also formed in an outwardly convex shape. Then, a thickness T1 of a widthwise center of the convex shape in the direction intersecting with the laser beam irradiation direction is made greater than the plate thickness T2 of the main body portion 41. Also, a thickness T3 of each of widthwise ends of the convex shape in the direction intersecting with the laser beam irradiation direction is made less than the plate thickness T2 of the main body portion 41. Hence, the heat capacity at the welded portion can be reduced. Accordingly, penetration of the welding portion by the laser beam can be effectively prevented while enabling welding at relatively low energy.

Further, a leading end of the linear portion 31 of the conductor segment 30 located in the winding end of the phase winding is extended inclining to the axial direction in the coil end portion CE2 in the same way as the leading end of the linear portion 31 of the conductor segment 30 located at a middle portion of the phase winding. Further, the laser beam irradiation surface 42c located in the protruding portion 42 of the neutral point busbar 14 has the same shape as the axial outer side surface 33a of the conductor exposed portion 33 of the conductor segment 30. Hence, since the shape of the laser beam irradiation surface 42c in the protruding portion 42 matches with the shape of the axial outer side surface 33a in the conductor exposed portion 33 of the conductor segment 30 acting as the joint partner of the protruding portion 42, irregular reflection of a laser beam can be effectively suppressed or reduced, while obtaining a favorable welding bead.

Further, in the protruding portion 42 of the neutral point busbar 14, the chamfer portion 45 diagonal to the axial direction is formed on a surface facing the stator core 11 in the axial direction. Hence, interference between the protruding portion 42 of the neutral point busbar 14 and the conductor segment 30 can be effectively suppressed or reduced.

Further, the neutral point busbar 14 is connected to the coil end portion CE2 with a surface of the rounded edge side in the plate thickness direction facing the stator core 11 and a surface of the non-rounded side facing an opposite side to the stator core 11. Hence, since the non-rounded side acts as the laser beam irradiation surface, irregular reflection of the laser beam and accordingly a problem, such as shallow penetration, etc., can be suppressed or reduced. Further, since a clear joining line appears on a contact surface at the joining portion, accuracy of appearance inspection can be improved.

The above-described embodiment can be modified in many ways as hereinbelow described.

Figure 18A:
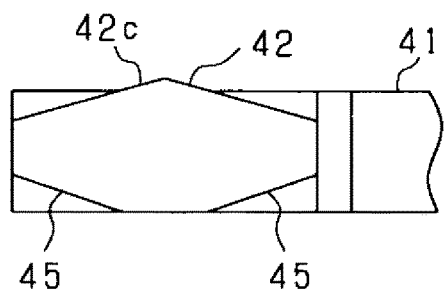
FIGS. 18A and 18B are diagrams collectively illustrating a modification of the protruding portion of the neutral point busbar shown in FIG. 9A.

First, in the above-described embodiment, both sides (i.e., two sides of the core side and a non-core side opposite to the core side) of the radial tip portion 42b of the protruding portion 42 intersecting with the laser beam irradiation direction have outwardly convex arc shapes, respectively. However, the present disclosure is not limited thereto and may increase other shapes as alternatives. For example, as shown in FIG. 18A, in the radial tip portion 42b of the protruding portion 42, both sides intersecting with the laser beam irradiation direction may have outwardly convex triangular shapes, respectively. It is also possible to employ polygonal shapes other than the triangular shapes.

Figure 18B:
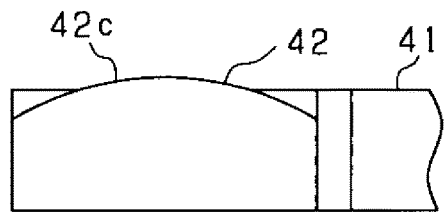

Further, as shown in FIG. 18B, in the radial tip portion 42b of the protruding portion 42, only a surface irradiated with a laser beam (i.e., a surface of the non-core side) may have either an outwardly convex arc shape or a triangular shape among both side surfaces intersecting with the laser beam irradiation direction. Alternatively, in the radial tip portion 42b of the protruding portion 42, only an opposite surface (i.e., a core side surface) opposite to the laser beam irradiation surface among the two side surfaces intersecting with the laser beam irradiation direction may have an outwardly convex arc shape or a triangular shape. In any situation, it is only needed for a surface of the protruding portion 42 intersecting with the laser beam irradiation direction during a laser welding process to have a shape swelling outward.

Further, in the above-described embodiment, each of the stator windings 12 has a segment structure composed of conductor segments 30. However, the present disclosure is not limited thereto and may include various structures as alternatives. For example, a continuous wire may be wound around one or more slots 23 of the stator core 11 by a way of wavy winding to form the stator winding 12.

Further, in the above-described embodiment, in order to suppress penetration of the laser beam through the welded portion generated when the neutral point busbar 14 is connected to the winding end portion of the stator winding 12, a thickness of the protruding portion 42 (i.e., the connection portion connecting to the winding end portion) in the laser beam irradiation direction is greater than the plate thickness of the main body portion 41 thereof. However, the present disclosure is not limited thereto and may employ the same configuration in connecting the power line busbar 13 with the other winding end portion of the stator winding 12. For example, when multiple windings of the same phase are connected in parallel, a power line busbar that connects to ends of these multiple windings is possibly employed for each phase. In such a situation, for the power line busbar, in order to suppress or reduce penetration of a welded portion by a laser beam, a thickness of each protruding portion (i.e., a connection portion connecting to a winding end portion) of the power line busbar may also be more thickened in the laser beam irradiation direction than a plate thickness of a busbar body portion thereof.

Further, the above-described embodiment of the present disclosure is described based on an inner rotor type electric machine. However, the present disclosure is not limited thereto and may employ an outer rotor type rotating electric machine. In such a situation, a neutral point busbar 14 or the like may be preferably provided radially inside of the coil end portion CE2 of the stator windings 12.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described stater core and may be altered as appropriate.

What is claimed is:

1. A stator comprising:
a stator core,
multiple stator windings provided in the stator core, and
a busbar connected to coil end portions of the stator windings,
the busbar being composed of a flat conductor body and having;
a main body portion extended in a circumferential direction in parallel to a circumference of the stator core, and
multiple protruding portions extended radially from the main body portion, the protruding portions and the coil end portions being joined by laser welding,
wherein a thickness of each of the protruding portions in a laser beam emitting direction in which a welded portion is irradiated with a laser beam during the laser welding is greater than a plate thickness in the same direction of the main body portion.

2. The stator as claimed in claim 1, wherein among a total length of the protruding portion in an extension direction extended from the main body portion, a given region of the protruding portion starting from a radial tip surface has a thickness greater than the plate thickness of the main body portion.

3. The stator as claimed in claim 1, wherein at least one side surface of the protruding portion intersecting with the laser beam emitting direction has a convex shape swelling outward.

4. The stator as claimed in claim 3, wherein a tip surface of the protruding portion has a greater thickness in a widthwise center in a direction intersecting with the laser emitting direction than the plate thickness of the main body portion, and
wherein the tip surface of the protruding portion has a thickness less than the plate thickness of the main body portion at at least one end portion thereof in the direction intersecting with the laser emitting direction.

5. The stator as claimed in claim 1, wherein the stator core has multiple slots arranged in the circumferential direction at a given interval of a rotation angle,
wherein the stator windings are composed of phase windings for each phase, each of the phase windings for each phase has a conductor arranged in slots as a slot accommodating coil portion at a given coil pitch in the circumferential direction,
wherein each of portions of the conductor in another coil end portion is extended oblique to the axial direction and is folded back at a given top position thereof in a middle portion of the phase winding;
wherein a portion of the conductor in the coil end portion of a winding end of the phase winding is extended inclining to the axial direction in the same direction as the conductor arranged in the middle portion of the phase winding, and
wherein an irradiation surface formed on the protruding portion to be irradiated with a laser beam during laser welding has substantially the same shape as an outer surface formed on the conductor of the winding end of the phase winding.

6. The stator as claimed in claim 5, wherein the conductor of each of the stator windings is composed of multiple conductor segments connected to each other,
wherein a first tip portion of the conductor segment extended in a given circumferential direction at an outside of the stator core in the axial direction and
a second tip portion of another conductor segment extended in a direction opposite to the given circumferential direction at the outside of the stator core in the axial direction are joined together in the coil end portion,
an outer surface of each of first and second tip portions of the conductor segments having a curved shape,
wherein every one of the protruding portions and the tip portions of the conductor segments are joined by laser welding, and
wherein the irradiation surface formed on the protruding portion has substantially the same shape as the outer surface formed on the tip portion of the conductor segment.

7. The stator as claimed in claim 5, wherein a given number of conductors are arranged in the slot side by side in a diameter direction of the stator core, and the conductor and the protruding portion overlap axially with each other, and
wherein a chamfer portion is formed obliquely to the axial direction on a surface of the protruding portion facing the stator core in the axial direction.

8. The stator as claimed in claim 1, wherein the busbar has a flat planar shape formed by applying press molding to a flat plate, the press molding creating a rounded edge on the flat plate as a result of operation, and
wherein the busbar is connected to the coil end portion with a first surface of the busbar having the rounded edge facing the stator core in a plate thickness direction, the busbar being connected to the coil end portion with a second surface of the busbar opposite to the first surface, facing an opposite direction to the stator core in the plate thickness direction.

* * * * *